United States Patent
Cha et al.

(10) Patent No.: US 11,432,548 B2
(45) Date of Patent: Sep. 6, 2022

(54) **METHODS FOR REPELLING *DROSOPHILA* SPECIES USING 2-PENTYLFURAN**

(71) Applicants: The United States of America, as represented by the Secretary of Agriculture, Washington, DC (US); Cornell University, Ithaca, NY (US)

(72) Inventors: Dong H. Cha, Hilo, HI (US); Gregory M. Loeb, Geneva, NY (US)

(73) Assignees: The United States of America, as represented by the Secretary of Agriculture, Washington, DC (US); Cornell University, Ithaca, NY (US)

( * ) Notice: Subject to any disclaimer, the term of this patent is extended or adjusted under 35 U.S.C. 154(b) by 0 days.

(21) Appl. No.: 17/174,394

(22) Filed: Feb. 12, 2021

(65) Prior Publication Data

US 2021/0251228 A1    Aug. 19, 2021

Related U.S. Application Data

(60) Provisional application No. 62/976,529, filed on Feb. 14, 2020.

(51) Int. Cl.
*A01N 43/08* (2006.01)

(52) U.S. Cl.
CPC .................. *A01N 43/08* (2013.01)

(58) Field of Classification Search
CPC ..................................................... A01N 43/08
See application file for complete search history.

(56) References Cited

PUBLICATIONS

Britannica Online Encyclopedia, Jan. 2022 (Year: 2022).*
Wikipedia 2020 (https://en.wikipedia.org/wiki/List_of_Drosophila_species) (Year: 2020).*
Wikipedia 2022 (https://en.wikipedia.org/wiki/Drosophila, Jan. 9, 2022) (Year: 2022).*
Singh, J Genet 2015, Jun. 94(2), 351-61 (Year: 2015).*
Reeder, J of Economic Entomology, 2001, 1584-1588 (Year: 2001).*
Wang, Pest Manag, Sci 2021,77, 3698-3705). (Year: 2021).*
Pham, WWW. nature, com, Scientific Reports, 2015, p. 1-8) (Year: 2015).*
Cha, Pest Manag, Sci, 2021,77, 1757-64). (Year: 2013).*
Rota-Stabelli, Current Biology, vol. 23, No. 1 R8-R9). (Year: 2013).*

* cited by examiner

*Primary Examiner* — Umamaheswari Ramachandran
(74) *Attorney, Agent, or Firm* — John Fado; Maria Restrepo-Hartwig

(57) ABSTRACT

Methods for repelling *Drosophila* species (e.g., *D. suzukii*, *D. melanogaster*) involving treating an object or area with a composition containing a *Drosophila* species (e.g., *D. suzukii*, *D. melanogaster*) repelling effective amount of 2-pentylfuran and optionally a carrier.

4 Claims, 7 Drawing Sheets

METHODS FOR REPELLING *DROSOPHILA* SPECIES USING 2-PENTYLFURAN

REFERENCE TO RELATED APPLICATION

This application claims the benefit of U.S. Provisional Application No. 62/976,529, filed 14 Feb. 2020, which is incorporated herein by reference in its entirety.

BACKGROUND OF THE INVENTION

Herein we disclose methods for repelling *Drosophila* species (e.g., *D. suzukii, D. melanogaster*) involving treating an object or area with a composition containing a *Drosophila* species (e.g., *D. suzukii, D. melanogaster*) repelling effective amount of 2-pentylfuran and optionally a carrier.

The invasive fruit fly, *Drosophila suzukii* (Matsumura) (spotted wing *drosophila* or SWD), is a destructive direct pest of soft-skinned fruit crops throughout the USA, Europe, and other regions. Unlike other fruit flies, SWD lays eggs into intact and marketable fruit. Berry crops such as raspberries and blueberries are especially vulnerable, although SWD attacks many other fruit crops and wild plants (Bolda, M. P., et al., Agric. Res. Econ. Update, 13: 5-8 (2010); Walsh, D. B., et al., Journal of Integrated Pest Management, 2: G1-G7 (2011); Lee, J. C., et al., Ann. Entomol. Soc. Am., 108: 117-129 (2015); Asplen, M. K., et al., J. Pest Sci., 88: 469-494 (2016); Elsensohn, J., and G. M. Loeb, Insects 9: 5 (2018), doi: 10.3390/insects9010005; Leach, H., et al., Agriculture and Forest Entomology, 21: 149-158 (2019)). Significant damage, increased pesticide use, and economic losses have occurred in the USA and Europe since SWD was detected in 2008. Indeed, the fear of the economic consequences of selling infested fruit has led growers to the pre-emptive and excessive use of insecticides, sometimes as often as every five days (Haye, T., et al., J. Pest Sci., 89: 643-651 (2016)). The consequences of the repeated use of often broad-spectrum insecticides are multifaceted, including increased production costs, increased human health risks, increased environmental costs in terms of impacts on beneficial organisms such as pollinators and natural enemies, increased risk of developing insecticide resistance and importantly, the disruption of effective and successful integrated pest management (IPM) programs.

Manipulating pest behavior to reduce overall population levels and/or impact on the focal crop is an ecologically-based approach to managing arthropod pests that can reduce reliance on insecticides (Rodriguez-Saona, C., and L. L. Stelinski, Behavior-modifying strategies in IPM, IN Integrated Pest Management: Innovation—Development Process Theory and Practice, Eds, Peshin, R., and A. K. Dhawan, Springer, New York, N.Y., pp. 261-311 (2009)). Mating disruption is the best known and successful example of behavioral manipulation for pest management purposes. However, this approach may not be effective against SWD given that mate recognition in this species is governed, in part, by cuticular hydrocarbons with low volatility, although lower molecular weight, longer distance pheromones may eventually be discovered (Snellings, Y., et al., Scientific Reports, 8: 4996 (2018), DOI: 10.1038/s41598-018-23189-6). Instead, researchers have focused on understanding the cues (often based on odors) used by SWD for finding and accepting and/or rejecting reproductive hosts as targets for behavioral manipulation (Cloonan K. R., et al., J. Chem. Ecol., 44: 922-939 (2018)). For example, deploying attractive odors in combination with a killing agent (e.g., attract and kill) has been examined by several research groups with varying success (Hampton, E., et al., J. Econ. Entomol., 107: 1849-1857 (2014); Rice, K. B., et al., J. Economic Entomology, 110: 535-542 (2017); Tait, G., et al., Bulletin of Insectology, 71: 295-307 (2018); Cloonan et al. 2018; Klick, J., et al., J. Insect Science, 19: 1-6 (2019), DOI: 10.1093/jisesa/iey/132). Attract and kill approaches to pest management can be enhanced with the inclusion of a repellent applied to or in the cash crop, thereby reducing colonization of the crop and increasing visitation to a trap crop or attract and kill trap. This has been referred to as stimulo-deterrent diversion or a push-pull system of behavioral manipulation (Miller, J., and R. Cowles, Journal of Chemical Ecology, 16: 3197-3212 (1990); Cook, S. M., et al., Ann. Rev. Entomol., 52: 375-400 (2007)). The best example of a successful use of the push-pull approach under field conditions involves use of the plant *Desmodium uncinatum* intercropped with maize in combination with an attractive grass on the exterior as a successful strategy for managing stem-boring Lepidoptera in parts of Africa (Khan, Z. R., et al., Field Crops Research, 106: 224-233 (2008)). It has been shown that a push-pull approach has potential for managing SWD (Wallingford, A. K., et al., Pest Management Science, 74: 120-125 (2017a, DOI: 10.1002/ps.4666).

Although considerable progress has been made in identifying SWD attractants used with attract and kill (Cloonan et al. 2018), for a push-pull technique to be successful it is necessary to identify suitable repellents. Progress has been made on plant essential oil-based repellents (Renkema, J. M., et al., Sci. Reports, 6: 21432 (2016); Renkema, J. M., et al., Insects, 8: 117 (2017)) and microbial-produced odors that may indicate to SWD an unsuitable or unhealthy environment or fruit (Wallingford, A. K., et al., Pest Management Science, 72: 701-706 (2016a), DOI: 10.1002/ps.4040; Wallingford, A. K., et al., Environmental Entomology, 46: 1041-1050 (2017b), doi: 10.1093/ee/nvx125; Cha, D. H., et al., Evidence for contextual avoidance of the ubiquitous phytopathogen *Botrytis cinerea* by *Drosophila suzukii*, Insect Science, In press 2019). Wallingford et al. (2016a) showed that releasing 1-octen-3-ol, a microbe-produced mushroom alcohol, near ripe raspberries significantly reduced infestation by SWD and further tested several different methods to deploy 1-octen-3-ol, such as SPLAT® (Mafra-Neto, A., et al., Manipulation of insect behavior with specialized pheromone and lure application technology (SPLAT®), IN: J. Beck et al. (editors), Pest Management with Natural Products, American Chemical Society, pp 31-58 (2013)) and an automated mister system that have reduced infestation in the field at scales larger than a single cluster of fruit (Wallingford, A., et al., Journal of Economic Entomology, 109: 1779-1784 (2016b); Stockton, D., et al., Pest Management Science, 77: 389-396 (2020), doi: 10.1002/ps.6028). Despite these encouraging results with 1-octen-3-ol, it has significant negative attributes such as an unpleasant odor at relevant concentrations. Thus there is a need for alternatives.

*D. melanogaster* (vinegar fly) is a global nuisance pest in households and in commercial food marketing and handling areas such as grocery stores, wineries, and produce storage areas (Zhu, et al., J. Chem. Ecol., 29: 899-909 (2003)). It is also an agricultural pest of wine grapes as a vector of rot organisms, especially sour rot (Hall, M., et al., Phytopathology, 108: 1429-1422 (2018)). Therefore, although *D. melanogaster* has not been considered as a serious pest, there is commercial interest to control this fly (Zhu et al. 2003). Current methods of control include sanitation, insecticide spray, and trapping. In households, sanitation (i.e., elimination of breeding sources such as fruits and vegetables) is recommended and effective in managing the fly. However, complete removal of breeding source is more difficult in other places where fruit and vegetables are grown, processed, stored, and displayed. Insecticides such as pyrethrin spray can be used to quickly reduce the number of flying *D. melanogaster*, but its use may not be recommended at locations processing food materials. There are several commercial and homemade attractants and traps based on vinegar and fruit volatiles (https://www.goodhousekeeping.com/home/cleaning/tips/a25042/how-to-kill-fruit-flies/), but they need to compete with breeding sources for attractiveness. Thus, similar to SWD, a method of pushing *D. melanogaster* flies away from breeding sources such as in a push-pull system may be an effective tool to control *D. melanogaster* by reducing their oviposition on breeding sources and also by reducing the number of flying adults by trapping repelled flies using attractive traps. A similar approach would be very useful in high-value wine grapes susceptible to sour rot and where insecticides are sometimes not effective due to resistance (Sun, H., et al., J. Econ. Entomol., 112: 1498-1501 (2019)).

Herein we disclose 2-pentylfuran as a novel *Drosophila* species (e.g., *D. suzukii, D. melanogaster*) repellent.

SUMMARY OF THE INVENTION

Methods for repelling *Drosophila* species (e.g., *D. suzukii, D. melanogaster*) involving treating an object or area with a composition containing a *Drosophila* species (e.g., *D. suzukii, D. melanogaster*) repelling effective amount of 2-pentylfuran and optionally a carrier.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

Exemplary

Exemplary

Exemplary

Exemplary

Exemplary

Exemplary

Exemplary

DETAILED DESCRIPTION OF THE INVENTION

Figure 1:
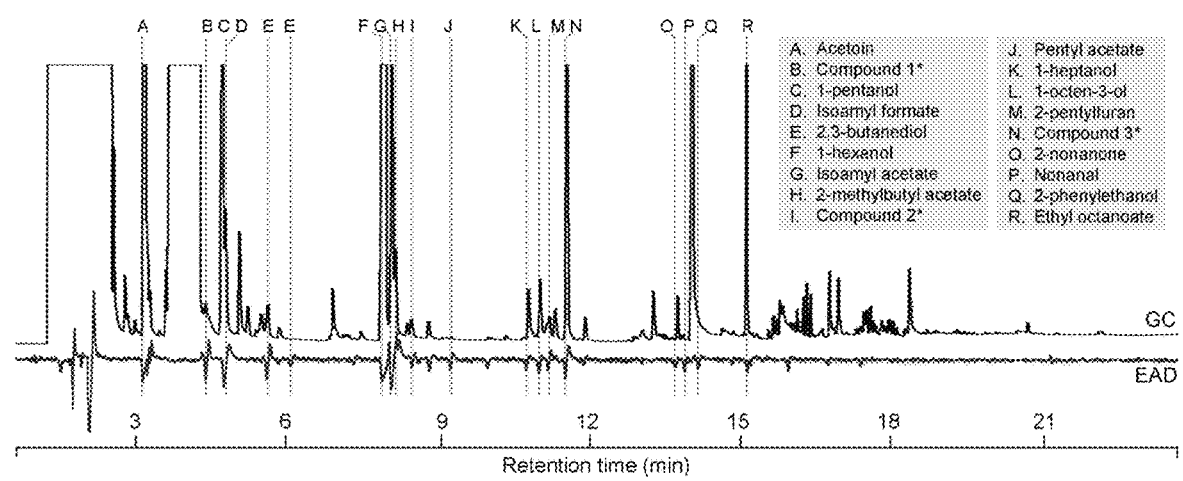
FIG. 1 shows simultaneously recorded gas chromatogram (GC) and electroantennogram responses (EAD) of typical adult female *Drosophila suzukii* antennae to adsorbent sample of bread dough headspace volatiles as described herein. Eighteen EAD-active volatiles (A-R) that consistently elicited antennal responses from *D. suzukii* individuals tested were identified. * indicates identified compounds that are currently under investigation for repellent activities to *D. suzukii*.

Herein we disclose methods for repelling *Drosophila* species (e.g., *D. suzukii, D. melanogaster*) involving treating (exposing) an object or area with a composition containing a *Drosophila* species (e.g., *D. suzukii, D. melanogaster*) repelling effective amount of 2-pentylfuran and optionally a carrier.

The terms "object" or "area" as used herein include any place where the presence of *Drosophila* species (e.g., *D. suzukii, D. melanogaster*) is not desirable, including any type of premises, which can be out-of-doors, such as in fields, gardens, lawns, and so forth, or indoors, such as in barns, garages, commercial buildings, homes, and so forth, or any area where *Drosophila* species (e.g., *D. suzukii, D. melanogaster*) are a problem, such as in shipping or storage containers (e.g., bags, boxes, crates, etc.), packing materials, bedding, and so forth. The term "treating" includes using a repellant dispenser (satchet, polyethylene tube, etc.) or puffer (canister) containing 2-pentylfuran. 2-pentylfuran can be dispensed as a spray formulation.

Other compounds (such as *Drosophila* species (e.g., *D. suzukii, D. melanogaster*) repellants known in the art) may be added to the composition provided they do not substantially interfere with the intended activity and efficacy of the composition; whether or not a compound interferes with activity and/or efficacy can be determined, for example, by the procedures utilized below.

"Optional" or "optionally" means that the subsequently described event or circumstance may or may not occur, and that the description includes instances in which said event or circumstance occurs and instances where it does not. For example, the phrase "optionally comprising a known *Drosophila* species (e.g., *D. suzukii, D. melanogaster*) repellant" means that the composition may or may not contain a known *Drosophila* species (e.g., *D. suzukii, D. melanogaster*) repellant and that this description includes compositions that contain and do not contain a known *Drosophila* species (e.g., *D. suzukii, D. melanogaster*) repellant. Also, by example, the phrase "optionally adding a known *Drosophila* species (e.g., *D. suzukii, D. melanogaster*) repellant" means that the method may or may not involve adding a known *Drosophila* species (e.g., *D. suzukii, D. melanogaster*) repellant and that this description includes methods that involve and do not involve adding a known *Drosophila* species (e.g., *D. suzukii*, *D. melanogaster*) repellant.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

The compounds described herein or compositions described herein to be used will be at least an effective amount of the compound, release rate of the compound, or diluted solution of the compound. Generally the concentration of the compounds will be, but not limited to, about 0.025% to about 10% (e.g., 0.025 to 10%, for example in an aqueous solution), preferably about 0.5% to about 4% (e.g., 0.5 to 4%), more preferably about 1% to about 2% (e.g., 1 to 2%). Or the release rate of the compounds will be, but not limited to, about 2.5 mg/h to about 15 mg/h (e.g., 2.5 to 15 mg/h), for example from sachet dispensers or automatic misters). The composition may or may not contain a control agent for known *Drosophila* species (e.g., *D. suzukii*, *D. melanogaster*), such as a biological control agent or an insecticide known in the art to kill *Drosophila* species (e.g., *D. suzukii*, *D. melanogaster*).

A composition containing 2-pentylfuran may optionally contain a carrier (e.g., agronomically or physiologically or pharmaceutically acceptable carrier). The carrier component can be a liquid or a solid material. The compositions optionally contain a carrier (e.g., agronomically or physiologically or pharmaceutically acceptable carrier). The carrier component can be a liquid or a solid material. The term "carrier" as used herein includes carrier materials such as those described below. As is known in the art, the vehicle or carrier to be used refers to a substrate such as a mineral oil, paraffin, silicon oil, water, membrane, sachets, disks, rope, vials, tubes, septa, resin, hollow fiber, microcapsule, cigarette filter, gel, fiber, natural and/or synthetic polymers, elastomers or the like. All of these substrates have been used for controlled release of effective amount of a composition containing the compounds disclosed herein in general and are well known in the art. Suitable carriers are well-known in the art and are selected in accordance with the ultimate application of interest. Agronomically acceptable substances include aqueous solutions, glycols, alcohols, ketones, esters, hydrocarbons halogenated hydrocarbons, polyvinyl chloride; in addition, solid carriers such as clays, laminates, cellulosic and rubber matrices and synthetic polymer matrices, or the like.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments and characteristics described herein and/or incorporated herein. In addition, the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions (e.g., reaction time, temperature), percentages and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 10% to a reference quantity, level, value, or amount. For example, about 1.0 g means 0.9 g to 1.1 g and all values within that range, whether specifically stated or not.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Insects: Colonies of SWD were maintained at Cornell AgriTech, Geneva, N.Y., and USDA-ARS, Hilo, Hi. Cornell AgriTech flies were reared at 25° C., 55% r.h., 16:8 L:D on standard cornmeal diet (1 L distilled water, 40 g sucrose, 25 g cornmeal (Quaker Oats Co., Chicago, Ill.), 9 g agar (No. 7060, Bioserve, Flemington, N.J.), 14 g torula yeast (No. 1720, Bioserve), 3 mL glacial acetic acid (Amresco, Solon, Ohio), 0.6 g methyl paraben (No 7685, Bioserve), and 6.7 mL ethanol). USDA-ARS flies were reared at 22.1±1.9° C., 71.7±3.1% r.h., 16:8 L:D on *Drosophila* medium (Carolina, Burlington, N.C.) with brewer's yeast (ACH Foods, Ankeny, Iowa).

Adsorbent Sampling from Bread Dough: The bread dough bait consisted of whole-wheat flour (17.25 g), sugar (2 g), dry active bread yeast (0.325 g), apple cider vinegar (1 ml), and water (25 ml) (Cha, D. H., et al., J. Econ. Entomol., 111: 645-652 (2018a)). Headspace volatiles were collected from 10 g bread dough ball placed in a screened specimen cup (130 ml) by using 2.41 closed volatile collection chambers (ARS, Inc., Gainesville, Fla.) with one air inlet adapter (7 mm ID) on the top and an outlet adapter (7 mm ID) on the bottom wall. Clean air from a filtering and delivery system (ARS Inc., Gainesville, Fla.) was pushed into the chamber at 0.7 L/min through the top inlet port, and volatiles from the dough were pushed out through volatile traps (activated charcoal adsorbent filters, ORBO™32-small, Supelco Inc., Bellefonte, Pa.) on the bottom of the chamber. An additional ORBO™ filter was used to ensure that no breakthrough occurred. For each sample of dough (2 dough samples total), adsorbent collections were made over a 2-day period at room temperature using the same volatile trap. Volatiles were eluted with 600 μl methylene chloride every 24 h from the filters of a given dough sample and combined across the total of the collecting days (from 2 dough samples). The combined extract was kept at −20° C. and subjected to as chromatography-electroantennographic detection (GC-EAD) and gas chromatography-mass spectrometry (GC-MS) analyses.

Coupled Gas Chromatographic-Electroantennographic Detection (GC-EAD): Coupled GC-EAD analysis was performed as described previously (Cha, D. H., J. Chem. Ecol., 34: 1180-1189 (2008); Cha, D. H., et al., J. Chem. Ecol., 38: 1419-1431 (2012)) using a Hewlett Packard 5890 Series II gas chromatograph equipped with either a non-polar DB-5 ms capillary column (30 m×0.25 mm ID, 0.25 μm film thickness; Agilent Technologies, Wilmington, Del.) or polar DB-WAXetr capillary column (30 m×0.25 mm ID, 0.25 μm film thickness; Agilent Technologies, Wilmington, Del.) in the splitless mode with 1 min sampling time. The oven temperature was programmed at 40° C. for 5 min, then increased by 15° C./min to 250° C., and held for 5 min. Injector and detector temperatures were set at 250° C. Nitrogen gas was the carrier at a flow of 2 ml/min. The column effluent was split 1:1 in the oven via a "Y" glass splitter (Supelco). One arm of the splitter led to the flame ionization detector (FID) (250° C.) and the other to the heated EAD port (250° C.). Whole head preparations were made of individual flies, age 5-9 day, for GC-EAD analysis (Cha et al. 2012). The head was separated from the body and its antennae positioned between two gold wire electrodes immersed in saline filled (Drosophila ringer solution; 46 mmol NaCl, 182 mmol KCl, 3 mmol CaCl2, and 10 mmol Tris HCl at pH 7.2) micropipettes in an acrylic holder. The antennal holder was placed inside a humidified condenser and maintained at 5° C. The output signal from the antenna was amplified by a customized high input impedance DC amplifier and recorded on an HP 3390A integrator.

Chemical Analysis: GC-MS was carried out with an Agilent 5975MS coupled with a Agilent 6890GC equipped with either a DB-5 ms capillary column (30 m×0.25 mm ID, 0.25 μm film thickness; Agilent Technologies, Wilmington, Del.) or DB-WAXetr capillary column (30 m×0.25 mm ID, 0.25 μm film thickness; Agilent Technologies, Wilmington, Del.). Helium was the carrier gas (1.0 ml/min constant flow). The GC temperature program was the same as used for the GC-EAD analyses. The MS transfer-line was held at 260° C., the MS source at 230° C., and the MS quad at 150° C. Mass spectra were taken in EI mode (at 70 eV) in the range from 40 m/z to 350 m/z with a scanning rate of 4.58 scan/s. GC-MS data were processed with the MDS-Chemstation software (Agilent Technologies). Volatile compounds that were consistently EAD active were tentatively identified by comparison of chromatographic retention times and mass spectra with the NIST 2.0 mass spectra database and with those of authentic standards analyzed on the same instrument. To confirm the identities of EAD-active compounds, the authentic standards (10 ng/μl) were tested on the SWD antennae and also were co-injected with the dough adsorbent extracts for EAD response.

Chemicals: Acetoin (≥96%, CAS No. 513-86-0), 1-pentanol (≥99%, CAS No. 71-41-0), isoamyl formate (≥97%, CAS No. 110-45-2), 2,3-butanediol (98%, CAS No. 208-173-6), 1-hexanol (≥99%, CAS No. 111-27-3), isoamyl acetate (98%, CAS No 123-92-2), 2-methylbutyl acetate (99%, CAS No. 624-41-9), pentyl acetate (99%, CAS No. 628-63-7), 1-heptanol (98%, CAS No. 111-70-6), 1-octen-3-ol (≥98%, CAS No. 3391-86-4), 2-pentylfuran (≥98%, CAS No. 3777-69-3), 2-nonanone (≥99%, CAS No. 821-55-6), nonanal (≥95%, CAS No. 124-19-6), 2-phenylethanol (≥99%, CAS No. 60-12-8), ethyl octanoate (≥98%, CAS No. 110-45-2), and compound 1, 2 and 3 were all purchased from Sigma-Aldrich (St. Louis, Mo.).

Multiple-Choice Bioassay: The multiple choice assay (N=8) was conducted with an arena design using a dome cage (60 cm W×60 cm L×60 cm H; BugDorm-2120 Insect tent; shop.bugdorm.com) as described in Cha et al. 2018b (Cha, D. H., et al., Environ. Entomol., 47: 946-950 (2018b)) to evaluate the effect of the individual EAD-active compounds (FIG. 1) on SWD attraction to previously identified 4-component SWD lure (Cha et al. 2012; Cha, D. H., et al., Pest Manag. Sci., 70: 324-331 (2014); Cha, D. H., et al., Environ. Entomol., 46: 907-915 (2017)). Among 18 EAD-active compounds in FIG. 1, acetoin, 1-hexanol, isoamyl acetate, 2-methylbutyl acetate, and 2-phenylethanol were previously tested for their behavioral effects (Cha et al. 2012, 2014) and not considered in this study. Therefore, we compared 13 EAD-active compounds in this study. Within each arena, 14 traps were positioned in a circle (40 cm diameter) at equal distance with each trap 9 cm apart along the circumference. We used an aluminum foil-covered 100-ml glass beaker with a cut centrifuge vial (0.7 cm diameter) inserted in the foil for SWD entry, as a trap (Cha et al. 2012). All 14 traps had the SWD lure comprised of acetic acid, ethanol, acetoin, and methionol. Acetic acid and ethanol were released from a 20 ml solution of 4% acetic acid+8% ethanol with soap, presented as a drowning solution in each trap. Acetoin (1 ml of 50% acetoin in water) and methionol (0.5 ml neat methionol) were individually released from two 1.5-ml vials with 3-mm hole on the lid with a piece of cotton as described in Cha et al. 2014. One of these 14 traps served as a control (with the 4-component SWD lure only) and the remaining 13 traps had one of the 13 EAD-active compounds added to the SWD-lure, loaded as described in Cha et al. 2012 and released from a 1.5-ml vial with 3-mm hole with a piece of cotton. A cotton ball (3 cm diameter) soaked with distilled water was placed in the center of the arena to provide water to SWD. Adult flies (~250, roughly 1:1 male:female ratio, 7-10 days old) were released in each arena. Choice assays started at 1:00 p.m. each day (21.5±0.9° C., 23.7±0.1% RH, 16:8 [L:D] h). The number of flies inside treatment and control traps was counted after 20 h.

Field Test 1: Effect of Unknown Release Rate of 2-Pentylfuran on SWD Oviposition. The objective of this field test was to confirm the repellent activity of 2-pentylfuran under field conditions. This experiment was conducted using a mixed variety planting of fall-bearing raspberries (primocane raspberries) at Cornell AgriTech in Geneva, N.Y. where we randomly assigned 32 fruiting clusters to one of two treatments: 1.5 ml centrifuge vial with 3 mm hole in lid and containing 0.5 ml 50% 2-pentylfuran in 1:1 ratio with mineral oil or vial with mineral oil only (similar to Wallingford et al. 2016a). After three days we collected ripe raspberries from each cluster and monitored SWD emergence over the 2 weeks in the laboratory (25 C, 55% RH, 16:8 L:D).

Effects of Release Rate of 2-pentylfuran on SWD Oviposition on Raspberry: No Choice Test. Based on the significant effect of 2-pentylfuran using an unknown release rate in the field, to better understand concentration response of SWD to 2-pentylfuran, we evaluated the response of adult SWD to different ranges of 2-pentylfuran release rates in 2 h no choice oviposition cage experiments conducted in the greenhouse (25° C.; natural light; 40-60% r.h.). Cages (60 cm W×60 cm H×180 cm L, BioQuip, Rancho Dominguez, Calif.) were shrouded with a piece of shade cloth (120 cm W×120 cm H×300 cm L). Four treatments (a high, medium, low and zero (control) 2-pentylfuran release rate) were compared by randomly assigning each treatment to four different cages (N=12). Six different release rates of 2-pentylfuran were grouped into four treatment groups: 0 mg/h (control), 0.2 and 0.6 mg/h (low), 2.5 mg/h (medium), and 5 and 10 mg/h (high). For high 2-pentylfuran release rate treatment, there were 7 replications of 5 mg/h and 5 replications of 10 mg/h. For low 2-pentylfuran treatment, there were 4 replications of 0.2 mg/h and 8 replications of 0.6 mg/h. Within each cage, we placed a square petri dish (size 100 mm×15 mm, Electron Microscopy Sciences, Hatfield, Pa.) with 24 holes (3.2 mm dia) drilled through the top (as the release point of 2-pentylfuran) of the petri dish. A control dispenser or one of 2-pentylfuran dispensers with different release rates (see below) was placed inside the petri dish under the 24 holes. Then, four organically grown raspberries, rinsed with distilled water prior to experiment, with the receptacle opening filled with cotton, were placed receptacle side down on top of the petri dish over the 2-pentylfuran release holes. Holes in the petri dish cover were spaced in a fashion that each of the four berries were encircled by 6 holes (see Wallingford et al. 2017b). Target release rates listed above were achieved from (1) a 2 ml scintillation vial (National Scientific, Rockwood, Tenn.) with a 0.159 cm hole drilled through the cap loaded with 100 µl of 2-pentylfuran for the target release rate of 0.2 mg/h, (2) a 2 ml scintillation vial loaded with 100 µl of 2-pentylfuran without cap for 0.6 mg/h release rate, (3) a cap of a 0.6 ml microcentrifuge vial (Laboratory Product Sales, Rochester, N.Y.) detached from the vial and loaded with 15 µl of 2-pentylfuran for 2.5 mg/h release rate, (4) two detached caps of 0.6 ml microcentrifuge vial, each loaded with 15 µl of 2-pentylfuran for 5 mg/h release rate, and (5) two detached caps of 1.5 ml microcentrifuge vial, each loaded with 20 µl of 2-pentylfuran+one detached cap of 0.6 ml microcentrifuge vial loaded with 15 µl of 2-pentylfuran for 10 mg/h release rate. Actual release rates from each dispenser used here was measured for each assay by recording weight of the dispensers prior and post assay. Twenty 5-7 day old female SWD were isolated in vials 4 h prior to the start of the assay, which was started at dusk time for colony flies. At the start of the assay, vials containing flies were uncovered and flies were allowed to passively exit ~50 cm from the target petri dish. Upon completion of the assay, total number of SWD eggs oviposited into the raspberries was determined with the aid of a dissecting microscope.

Field cage choice test: We evaluated the effect of 2-pentylfuran released at 10 mg/h on SWD oviposition in choice oviposition experiment under semi-field condition using flies from SWD lab colony in Hawaii. For this experiment, we used a different, more user-friendly dispenser (polyethylene sachet: see Cha et al. 2017). The 10 mg/h release rate of 2-pentylfuran, inferred from calculating weight loss of loaded dispensers over time as described by Cha et al. 2017 (linear regression between weight of sachet containing 2-pentylfuran (mg) and time (h) during 30 h period: sachet weight=669.1+11.1*time, $R^2$=0.99, $P<0.0001$) was achieved using equilateral triangle shaped sachets made with two layers of polyethylene film (0.0508 mm thickness, Thermwell Products Co., Inc, Mahwah, N.J.) with 5 cm on each side. One 2 cm by 1 cm diameter piece of cotton dental wick was placed into the sachet and 1 ml of neat 2-pentylfuran was loaded onto the dental wick with a syringe. Loaded sachets were sealed using an Impulse heat-sealer (Model MP-12C, Midwest Pacific Inc., St. Louis). We presented organic raspberries placed inside a deli cup (475 ml) with water agar at the base to provide moisture and removed 25%, 50%, and 75% of the surface area of deli cup sides to allow flies to enter by cutting out 4 equal parts of side wall surface to make sure that the effect of 2-pentylfuran is observed even when the opening is large. The choice test was conducted using three 60 cm×60 cm×120 cm cage (BugDorm, www.bugdorm.com) for 25%, 50%, and 75% surface removal treatments with each cage placed in one of four field olfactometers in Hilo, Hi. (Jang, E. B., and K. A. Nishijima, Environ. Entomol., 19: 1726-1731 (1990)) for a total of 4 replications. On one side of the cage we placed a deli cup with 5 raspberries plus one polyethylene sachet releasing 2-pentylfuran at 10 mg/h and on the opposite side we placed another deli cup with 5 raspberries and an empty sachet as the control. Approximately 100 mixed age and sex colony flies were released in each cage over 24 hours at which time fruit was returned to the lab to enumerate number of eggs.

Field test 2 with known 2-pentylfuran release rate: We evaluated the effect of a known release rate of 2-pentylfuran on SWD infestation using 15 small plots of primocane raspberries (each plot=three 7 m rows of Heritage raspberries with 2.4 m between rows and with approximately 11 raspberries planted within each row) planted at different sites on research farms at Cornell AgriTech (plots separated by at least 0.5 km). The plantings were established in 2018 and the trial was conducted in the fall of 2019 as ripe raspberries were present along with high levels of SWD infestations in the area. At each plot we identified two fruiting canes (one for 2-pentylfuran treatment and one for control) that had large green fruit present separated by at least 3 m. After hand removal of any pink or ripe fruit, on 12 Sep. 2019, we covered the fruiting end of the canes with fine mesh bags (Trimaco, Inc., Morrisville, N.C.), sealed around the cane with a twist tie, to allow green fruit to ripen but prevent oviposition by resident SWD. At the same time, we bagged two additional canes per plot to determine baseline infestation level. Four days later, ripe raspberries inside these bags were collected to measure baseline infestation. At the same time we removed mesh bags over raspberries previously selected for 2-pentylfuran experiment and inserted the fruit end of each cane into a modified 540 ml deli cup with approximately 80% of the side surface area removed similarly to the field cage choice experiment (see above) to allow physically unrestrained SWD access to the fruit and nearly unimpeded air movement. Then we placed two 2-pentylfuran sachets, the same sachet design as described for the Field Cage Choice Test above, in one of two cups in each plot, while we placed two control sachets of same dimension containing moistened cotton as control in other cup. The 2-pentylfuran sachets from four randomly chosen plots were weighed immediately before deployment and at the end of the trial to estimate the actual amount of 2-pentylfuran released during the field trial. After two days the fruit inside each cup was collected and returned to the laboratory to rear out any SWD oviposited in the fruit during the two-day period. Ripe berries were removed from the canes, counted, weighed, placed in rearing cups (540 ml deli cups with approximately 1 cm of water agar at base with a perforated lid), and placed in a walk-in growth chamber (25°

C., 55% r.h., 16:8 L:D) for 6 days at which time SWD were enumerated (mostly pupae, a few large larvae). Fruits from canes that were collected to estimate the background level of SWD infestation were evaluated for SWD infestation using the same method as for the canes used to test 2-pentylfuran.

Two-Choice Bioassay with *Drosophila melanogaster*: The two-choice assay (N=5) was conducted with an arena design using a dome cage (30 cm W×30 cm L×30 cm H; shop.bugdorm.com) as described in Cha et al. (2012) to evaluate the effect of 2-pentylfuran on *D. melanogaster*, vinegar fly, attraction to apple cider vinegar, a known attractant. The same gate cup trap design was used as described above in Multiple-Choice Bioassay section. Both traps had 20 ml of apple cider vinegar with soap. One of two traps had a sachet releasing 2-pentylfuran at 10 mg/h, prepared as described in Field Cage Choice Test section above. A cotton ball (3 cm diameter) soaked with distilled water was placed in the center of the arena to provide water to *D. melanogaster*. Adult flies (~50, roughly 1:1 male: female ratio, 7-10 days old) were released in each arena. The number of flies inside treatment and control traps was counted after 20 h.

Statistical Analyses: Trap catch data from multiple-choice assay and two-choice assay were analyzed in a randomized block design with block as a random factor and different EAD-active compounds as a fixed factor using Poisson distribution with log link function and maximum likelihood estimation (Proc Glimmix, SAS Institute, SAS/STAT 9.2 User's Guide, Second Edition, 2009, SAS Institute Inc., Cary, N.C.). Oviposition data from (1) laboratory dose-response test, (2) semi-field cage choice test, and (3) first and second field experiments were also analyzed in a randomized block design with block as a random factor and different 2-pentylfuran treatments as a fixed factor using Poisson distribution with log link function and maximum likelihood estimation. The means were compared using the Tukey-Kramer test (SAS Institute 2009).

Results. Identification of EAD-active Bread Dough Volatiles: SWD females were tested for GC-EAD activity using adsorbent extracts of bread dough (FIG. 1). The 18 corresponding active compounds were identified as (A) acetoin, (B) compound 1*, (C) 1-pentanol, (D) isoamyl formate, (E) 2,3-butanediol, (F) 1-hexanol, (G) isoamyl acetate, (H) 2-methylbutyl acetate, (I) compound 2*, (J) pentyl acetate, (K) 1-heptanol, (L) 1-octen-3-ol, (M) 2-pentylfuran, (N) compound 3*, (0) 2-nonanone, (P) nonanal, (Q) 2-phenylethanol, and (R) ethyl octanoate (* indicates compounds that are currently being evaluated for additional repellency and thus cannot be disclosed). Among the 18 active compounds, five compounds (acetoin, 1-hexanol, isoamyl acetate, 2-methylbutyl acetate, and 2-phenylethanol) were previously identified as EAD-active from wine and vinegar and tested for behavioral effect on SWD (Cha et al. 2012, 2014). Thus, the 13 other EAD-active compounds were considered for behavioral effect on SWD.

Figure 2:
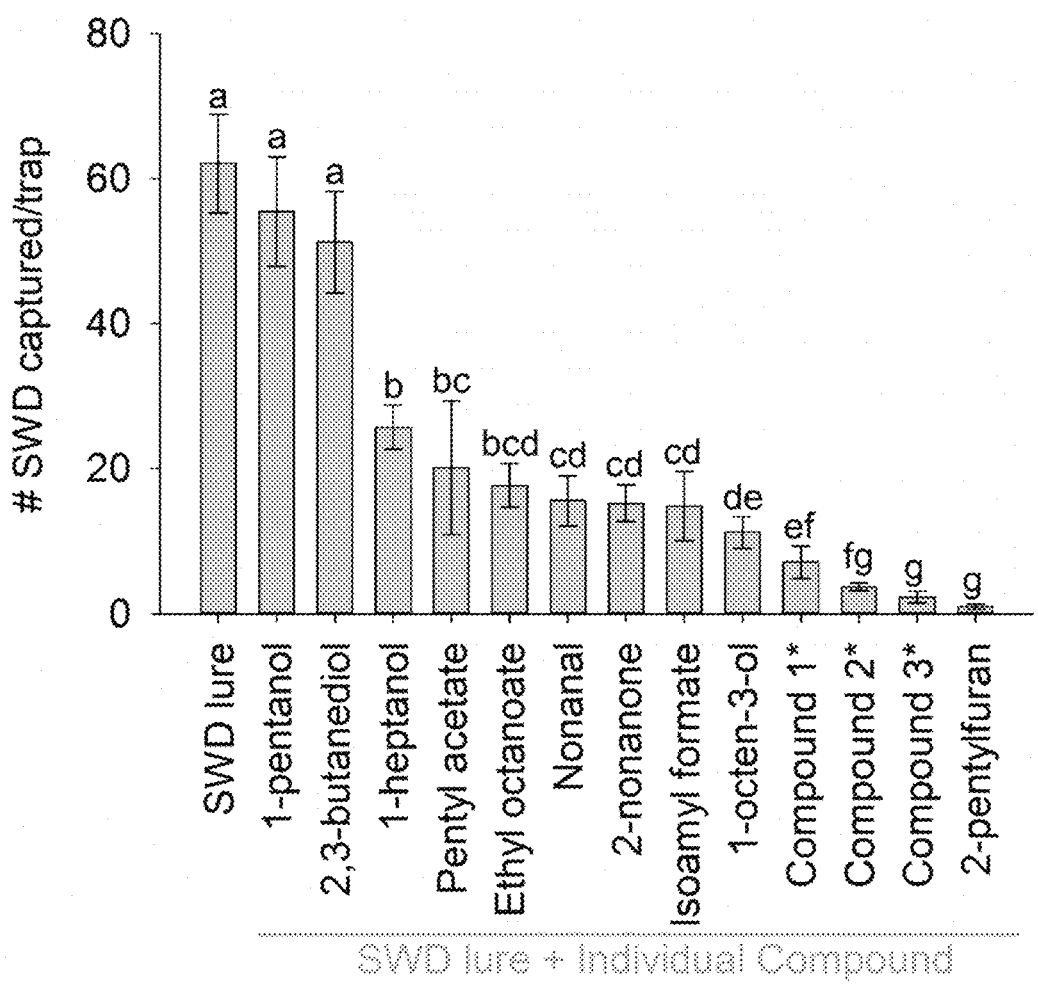
FIG. 2 shows multiple choice assay with gated cup traps containing the four components of the SWD lure plus one additional compound as described herein. Different letters on bars indicate significant differences by Tukey-Kramer tests at $P<0.05$. $N=8$. * indicates identified compounds that are currently under investigation for repellent activities to *D. suzukii*. SWD indicates spotted wing *drosophila*.

Multiple-Choice Bioassay: Effect of EAD-active Volatiles on SWD Attraction to 4-Component SWD Lure. None of the 13 EAD-active volatiles from bread dough increased SWD attraction to the SWD lure (FIG. 2). Interestingly, 11 EAD-active volatiles significantly reduced SWD attraction to the SWD lure ($F_{13,91}=102.08$, $P<0.0001$). Importantly, the negative effect of three compounds (compound 2, compound 3, and 2-pentylfuran) were significantly stronger than 1-octen-3-ol that was previously shown repellent to SWD in the field (Wallingford et al. 2016a, 2016b). In this multiple-choice test, adult SWD discriminated against 2-pentylfuran the most.

Figure 3:
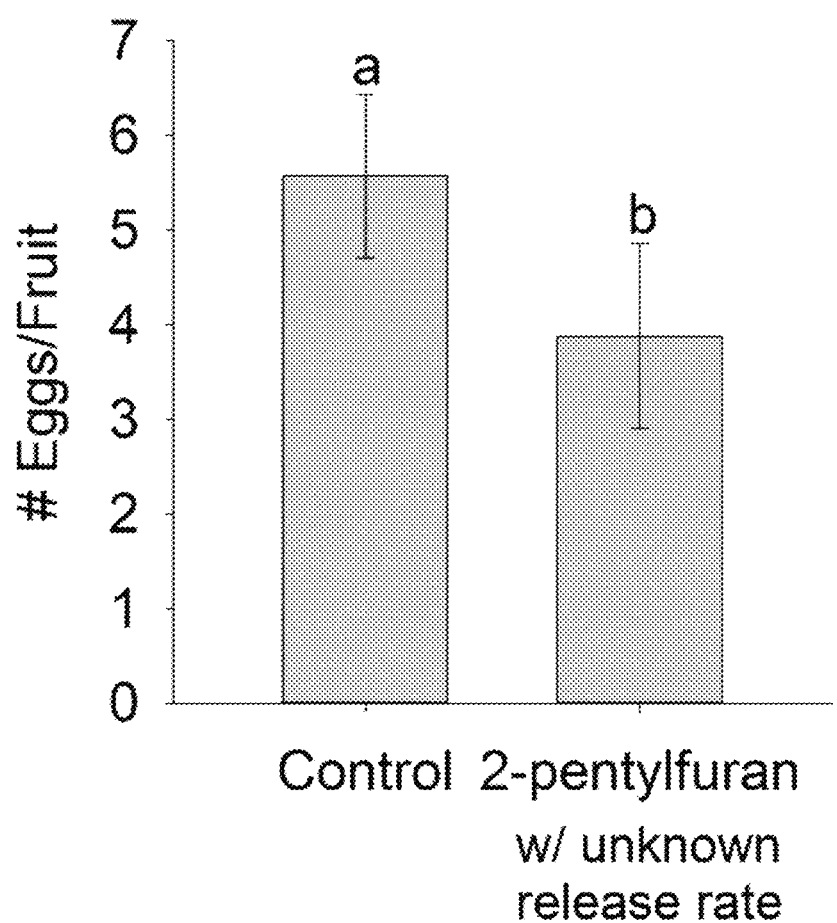
FIG. 3 shows *Drosophila suzukii* infestation in field raspberries with and without 2-pentylfuran released (unknown release rate) in close proximity as described herein. Different letters on bars indicate significant differences by Tukey-Kramer tests at $P<0.05$. $N=16$.

Field Test 1: Effect of Unknown Release Rate of 2-Pentylfuran on SWD Oviposition. The 2-pentylfuran treatment significantly reduced the number of eggs per raspberry fruit by 30% ($F1,30=4.76$, $P=0.0371$) (FIG. 3). All of the adult flies reared from fruit were confirmed as SWD.

Figure 4:
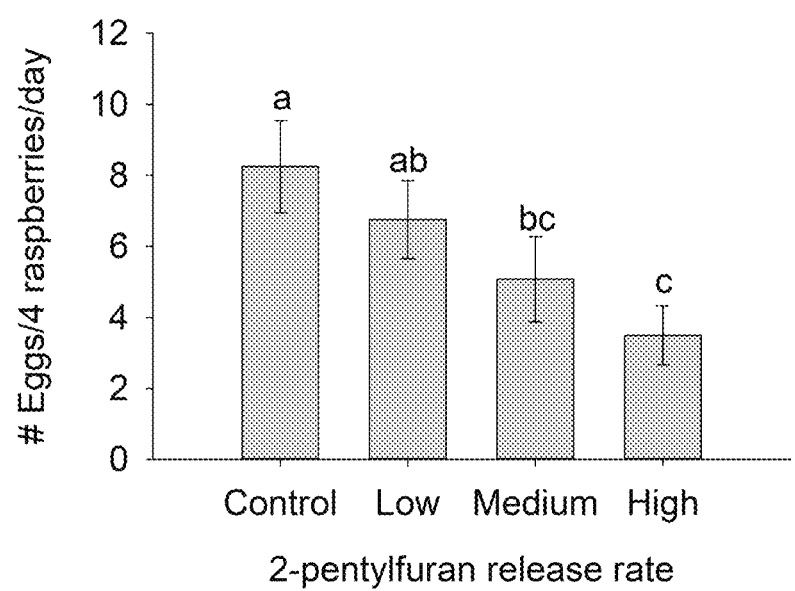
FIG. 4 shows *Drosophila suzukii* eggs oviposited on raspberries as a function of different release rates of 2-pentylfuran in no-choice experiment as described herein. Different letters on bars indicate significant differences by Tukey-Kramer tests at $P<0.05$. $N=12$.

No-Choice Laboratory Experiment: Effect of Release Rate of 2-Pentylfuran on SWD Oviposition: The response of adult SWD to different release rate groups (low, medium, and high) of 2-pentylfuran in no-choice setting showed that SWD oviposition began to decline relative to control at around 2.5 mg/h release rate (medium release rate tested in this study; FIG. 4). Under high release rate tested (5 and 10 mg/h), there was 58% reduction in number of eggs laid compared to the control treatment.

Figure 5:
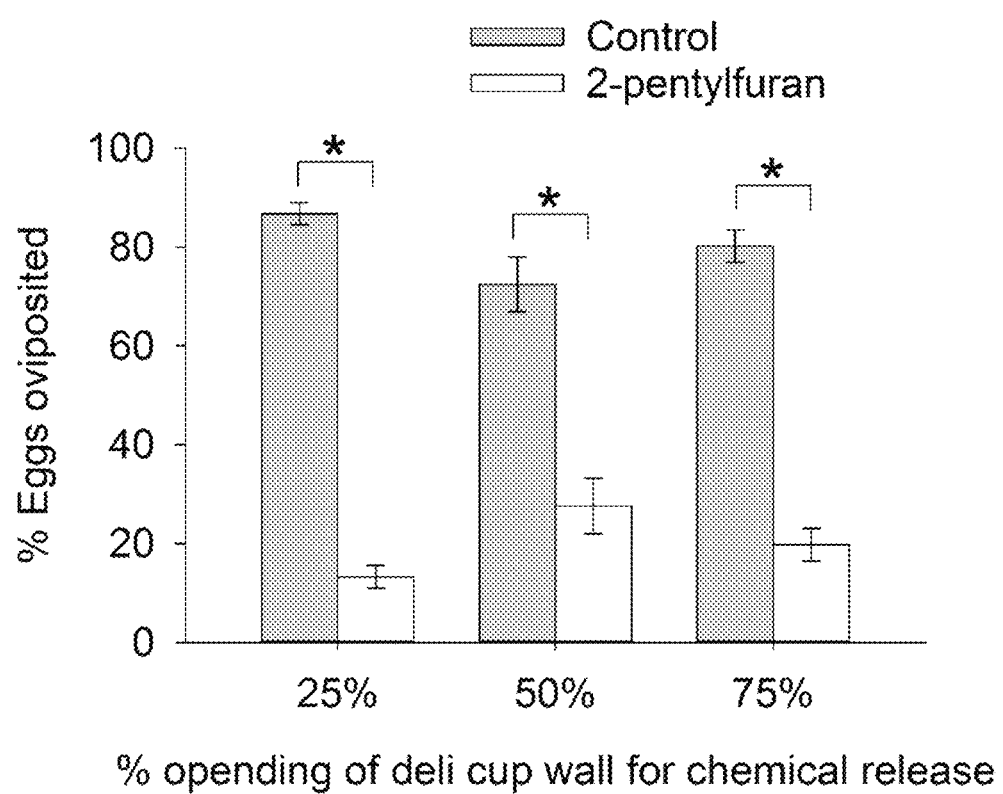
FIG. 5 shows effect of 2-pentylfuran on *Drosophila suzukii* eggs oviposited on raspberries in choice tests conducted in field cages using deli cup containers with three different amount of side wall area removed (25, 50, and 75% removed) as described herein. % oviposition is calculated based on # of eggs oviposited per berry (5 berries per deli cup container). * indicates significant difference between control and 2-pentylfuran treatment under given % opening. $N=4$.

Choice Experiment in Field Cage: Effect of 10 mg/h Release Rate of 2-Pentylfuran on SWD Oviposition. Releasing 2-pentylfuran at 10 mg/h (estimated in fume hood) in a deli cup significantly reduced SWD egg laying on raspberries relative to control in a two choice experiment. Regardless of the percentage of opening in the side wall of deli cups, we found a significant effect of 2-pentylfuran on SWD oviposition (85%, 62%, and 75% reductions by 2-pentylfuran treatment in experiments conducted using deli cups with 25%, 50%, and 75% openings, respectively; for all three experiments with different amount of opening, $74<F1,3<163$, $P<0.0033$) (FIG. 5). Average total number of eggs oviposited within an arena across the two treatments was 199±60 SE, 236±37 SE, and 302±24 SE for experiments with 25, 50, 75% opening, respectively.

Figure 6:
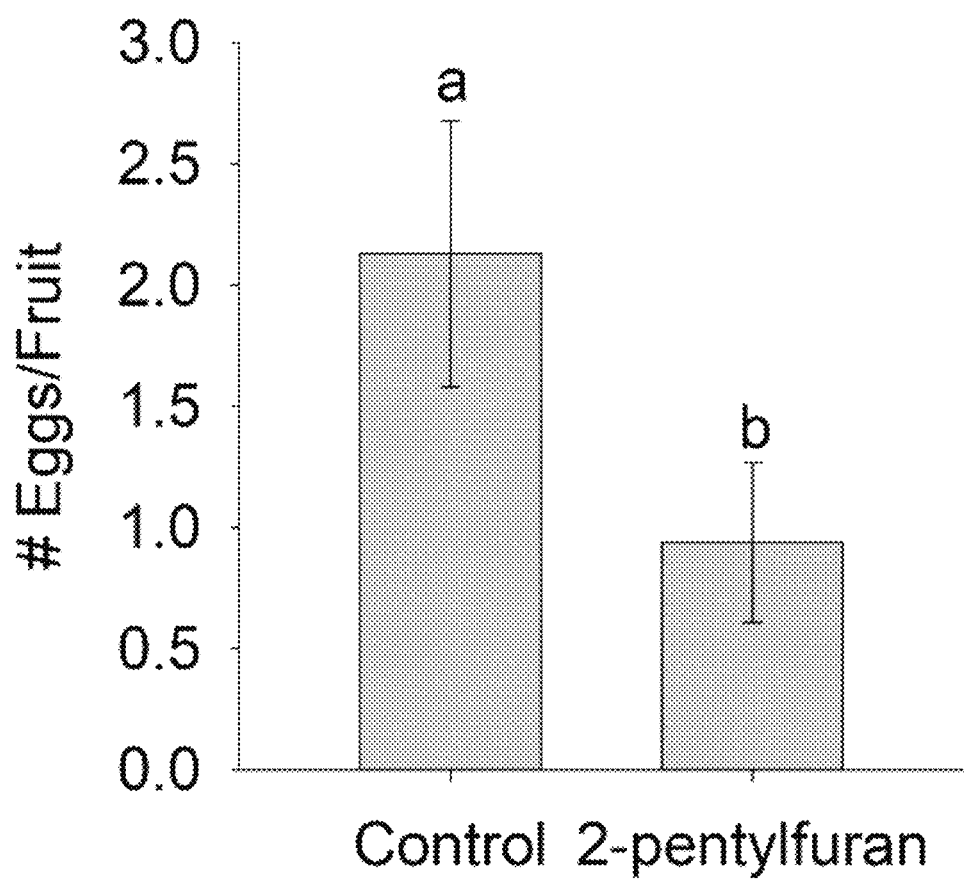
FIG. 6 shows *Drosophila suzukii* infestation in field raspberries with and without 2-pentylfuran released (14 mg/h) in close proximity as described herein. Different letters on bars indicate significant differences by Tukey-Kramer tests at $P<0.05$. $N=15$.

Effect of controlled release rate of 2-pentylfuran on SWD infestation in field: Over the course of the 48 h of this field experiment the actual release rate of 2-pentylfuran was estimated at 14.18 mg/h released from two sachets in a trap (SE=0.24). SWD infestation per berry was significantly reduced by 56% relative to control berries not treated with 2-pentylfuran ($F1,14=6.55$, $P=0.0227$; FIG. 6). The background level of infestation of fruit at the start of the experiment averaged 0.81 SWD/fruit±0.20.

Figure 7:
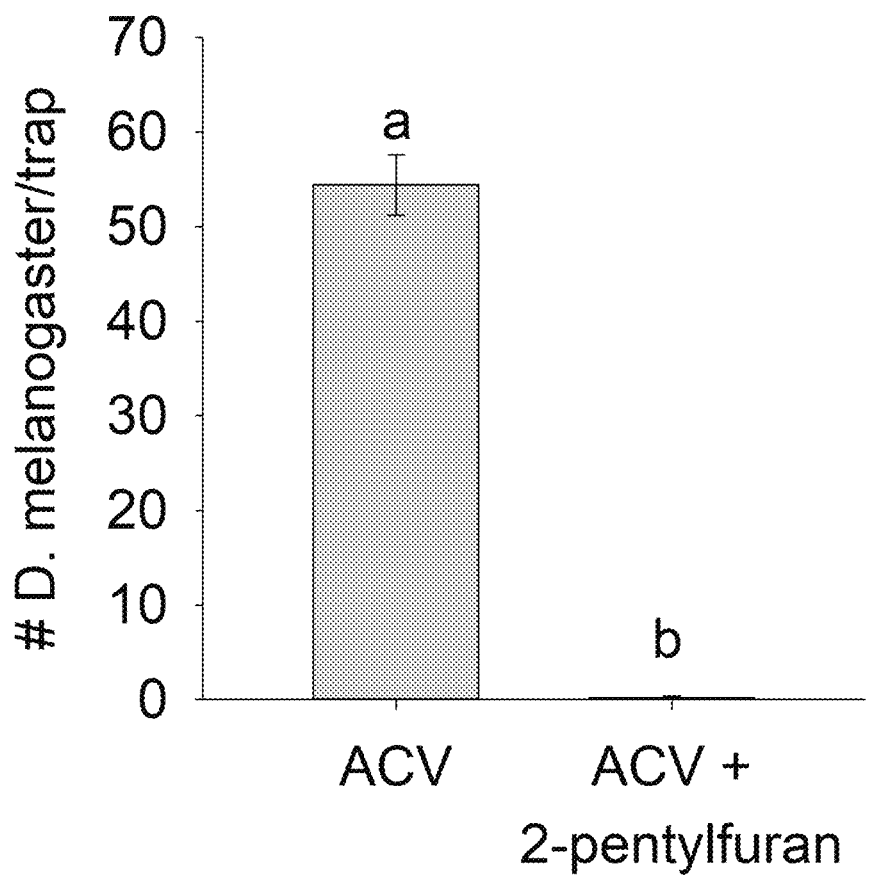
FIG. 7 shows the repellent effect of 2-pentylfuran on *Drosophila melanogaster* in two-choice assay between a gated cup trap containing apple cider vinegar (ACV: attractant for *D. melanogaster*) and a gated trap containing both ACV and 2-pentylfuran as described herein. Different letters on bars indicate significant differences by Tukey-Kramer tests at $P<0.0001$. $N=5$.

Effect of 2-pentylfuran on *Drosophila melanogaster* attraction: Releasing 2-pentylfuran at 10 mg/h (estimated in fume hood) in a gated trap significantly reduced *D. melanogaster* attraction to apple cider vinegar, a known attractant of the fly ($F1,4=31.31$, $P=0.0050$; FIG. 7). Among five replications, surprisingly only one *D. melanogaster* was captured in traps baited with apple cider vinegar and 2-pentylfuran, while 50~67 *D. melanogaster* were captured in traps baited with apple cider vinegar.

Discussion: In this study, 2-pentylfuran was identified as a novel repellent for SWD in terms of significant reductions in attraction to a commercially available lure used for monitoring (the SWD lure; Cha et al. 2014) and reductions in oviposition on a preferred host fruit, raspberry, in the laboratory and field. In the multichoice lab assay, while none of the EAD-active fermenting bread dough volatiles that were added to the SWD lure (Cha et al. 2012, 2014) increased the capture of SWD, adding 2-pentylfuran or some other individual EAD-active compounds significantly lowered the SWD catches in traps baited with the SWD lure with 2-pentylfuran surprisingly causing the greatest reduction. Our subsequent test results showed that 2-pentylfuran was surprisingly effective at reducing SWD infestation in greenhouse cage no choice conditions, in semi-field cage experiments under choice conditions, and under open field choice conditions with high pest pressure. The level of reduction in egg-laying varied for different experiments but generally exceeded 50% with higher release rates. Under no choice greenhouse conditions, we observed evidence of repellency at release rates of around 2.5 mg/h and increased repellency at higher release rates (5-10 mg/h). Given that the biological activity of 2-pentylfuran around 10 mg/h were similar in subsequent choice trials under semi-field and field conditions, it is anticipated that 2-pentylfuran can be used as an effective chemical repellent with potential use in the reduction of SWD oviposition on farms while reducing the need for costly and disruptive insecticides.

Previous studies have shown 1-octen-3-ol as a potential repellent for SWD (Wallingford et al. 2016a, 2016b, 2017a). In the laboratory multi-choice trial, surprisingly 2-pentylfuran had significantly stronger repellent effect than 1-octen-3-ol and there were also two additional compounds (compounds 2 and 3; FIG. 2) with potentially stronger repellent effects than 1-octen-3-ol. The repellent properties of compound 2 and 3 on SWD are currently being further evaluated, individually and also in various combinations, and the identification of those compounds will be reported in future publications. In this study, we were particularly interested in 2-pentylfuran because, in addition to surprisingly showing the greatest level of repellency in the multiple-choice trial, it also has a mild, pleasant odor and is registered as a food additive and considered generally safe (GRAS Reference: 3317; www.femaflavor.org). Also, as far as we know based on literature searches and database of *Drosophila* odorant response (Munch, D., and C. G. Galizia, Sci. Rep., 6: 21841 (2016)), 2-pentylfuran is a novel ligand never studied for *Drosophila* olfaction and repellency.

Surprisingly 2-pentylfuran also showed repellent activity to *D. melanogaster* by significantly reducing adult attraction to apple cider vinegar, a known attractant for *D. melanogaster*. In fact, the effect was quite strong; among five replications, only one *D. melanogaster* was captured in traps baited with the combination of apple cider vinegar and 2-pentylfuran compared to 5067 flies captured in traps baited with apple cider vinegar only. This result is comparable to SWD response to 2-pentylfuran where 2-pentylfuran reduced trap catches of SWD by 98% (from 62 SWD/trap to 1 SWD/trap; FIG. 2), suggesting that 2-pentylfuran can surprisingly be an effective repellent for both SWD and *D. melanogaster*.

All of the references cited herein, including U.S. Patents and U.S. Patent Application Publications, are incorporated by reference in their entirety, including Cha, D. H., et al., "2-Pentylfuran: a novel repellent of *Drosophilia suzukii*," Pest Manag. Sci. 2020.

Thus, in view of the above, there is described (in part) the following:

A method for repelling *Drosophila* species (e.g., *D. suzukii*, *D. melanogaster*), said method comprising (or consisting essentially of or consisting of) treating an object or area with a composition comprising (or consisting essentially of or consisting of) a *Drosophila* species (e.g., *D. suzukii*, *D. melanogaster*) repelling effective amount of 2-pentylfuran and optionally a carrier.

A method for repelling *Drosophila* species (e.g., *D. suzukii*, *D. melanogaster*), said method comprising (or consisting essentially of or consisting of) exposing *Drosophila* species (e.g., *D. suzukii*, *D. melanogaster*) with a composition comprising (or consisting essentially of or consisting of) a *Drosophila* species (e.g., *D. suzukii*, *D. melanogaster*) repelling effective amount of 2-pentylfuran and optionally a carrier.

The above methods, wherein 2-pentylfuran is the sole *Drosophila* species repellant.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein).

The invention illustratively disclosed herein suitably may be practiced in the absence of any element (e.g., method (or process) steps or composition components) which is not specifically disclosed herein. Thus, the specification includes disclosure by silence ("Negative Limitations In Patent Claims," AIPLA Quarterly Journal, Tom Brody, 41(1): 46-47 (2013): " . . . Written support for a negative limitation may also be argued through the absence of the excluded element in the specification, known as disclosure by silence. . . . Silence in the specification may be used to establish written description support for a negative limitation. As an example, in Ex parte Lin [No. 2009-0486, at 2, 6 (B.P.A.I. May 7, 2009)] the negative limitation was added by amendment. . . . In other words, the inventor argued an example that passively complied with the requirements of the negative limitation . . . was sufficient to provide support. . . . This case shows that written description support for a negative limitation can be found by one or more disclosures of an embodiment that obeys what is required by the negative limitation. . . . "

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A method for repelling *Drosophila* species, said method comprising treating an object or area with a composition comprising a *Drosophila* species repelling-effective amount of 2-pentylfuran and optionally a carrier; wherein said *Drosophila* species is *D. suzukii* or *D. melanogaster*.

2. The method of claim 1, wherein the 2-pentylfuran is from bread dough.

3. The method of claim 1, wherein the composition contains a carrier.

4. The method of claim 3, wherein the carrier is selected from mineral oils, paraffin, silicon oil, water, membrane, glycols, alcohols, ketones, esters, polyvinyl chloride, clay, laminate, cellulosic matrix, rubber matrix, or synthetic polymer matrix.

* * * * *